US012710408B2

(12) United States Patent
Quarmby

(10) Patent No.: US 12,710,408 B2
(45) Date of Patent: Aug. 18, 2026

(54) SYSTEMS AND METHODS FOR INJECTION MONITORING AND DIAGNOSTICS FOR GAS CHROMATOGRAPHY

(71) Applicant: Thermo Finnigan LLC, San Jose, CA (US)

(72) Inventor: Scott T. Quarmby, Round Rock, TX (US)

(73) Assignee: Thermo Finnigan LLC, San Jose, CA (US)

( * ) Notice: Subject to any disclaimer, the term of this patent is extended or adjusted under 35 U.S.C. 154(b) by 337 days.

(21) Appl. No.: 18/530,886

(22) Filed: Dec. 6, 2023

(65) Prior Publication Data

US 2025/0189497 A1 Jun. 12, 2025

(51) Int. Cl.

| | |
|---|---|
| ***G01N 30/88*** | (2006.01) |
| ***B01D 53/02*** | (2006.01) |
| ***B01D 53/30*** | (2006.01) |
| ***G01N 30/20*** | (2006.01) |
| ***G01N 30/32*** | (2006.01) |
| *G01N 30/02* | (2006.01) |

(52) U.S. Cl.

CPC ........... *G01N 30/88* (2013.01); *B01D 53/025* (2013.01); *B01D 53/30* (2013.01); *G01N 30/20* (2013.01); *G01N 30/32* (2013.01); *G01N 2030/025* (2013.01); *G01N 2030/328* (2013.01)

(58) Field of Classification Search

CPC ........ G01N 30/88; G01N 30/20; G01N 30/32; G01N 2030/025; G01N 2030/328; B01D 53/025; B01D 53/30

USPC .......................................................... 73/23.36

See application file for complete search history.

(56) References Cited

U.S. PATENT DOCUMENTS

| | | | | |
|---|---|---|---|---|
| 5,803,951 | A | 9/1998 | Wada et al. | |
| 5,938,817 | A | 8/1999 | Shibamoto et al. | |
| 6,389,879 | B1 | 5/2002 | Grob et al. | |
| 8,968,560 | B2 | 3/2015 | Steinecker | |
| 11,215,590 | B2 * | 1/2022 | McPartland | G01N 30/40 |
| 2009/0150087 | A1 * | 6/2009 | Steinecker | G01N 30/461 73/19.02 |
| 2018/0164260 | A1 * | 6/2018 | Agah | G01N 30/30 |
| 2021/0063363 | A1 | 3/2021 | Kaminski et al. | |

(Continued)

FOREIGN PATENT DOCUMENTS

| | | |
|---|---|---|
| JP | H0792149 A | 4/1995 |
| JP | H09210979 A | 8/1997 |

(Continued)

*Primary Examiner* — Peter J Macchiarolo
*Assistant Examiner* — Rodney T Frank

(57) ABSTRACT

A system for gas chromatography includes an inlet configured to receive a sample by injection, a column having a stationary phase, a flow control system, and an injection monitoring system. The flow control system is configured to regulate, based on a flow control parameter, flow of a mobile phase through the inlet and the column. The injection monitoring system is configured to obtain flow control data representative of a measure of the flow control parameter over time during a time period encompassing an injection of the sample into the inlet; determine, based on the flow control data, that the injection was unsuccessful; and perform, based on the determination that the injection was unsuccessful, a mitigation operation to mitigate the unsuccessful injection of the sample.

23 Claims, 9 Drawing Sheets

(56) References Cited

U.S. PATENT DOCUMENTS

| | | | | |
|---|---|---|---|---|
| 2021/0310998 | A1 | 10/2021 | Mccauley et al. | |
| 2022/0178890 | A1 | 6/2022 | Shinholt et al. | |
| 2023/0243791 | A1 * | 8/2023 | Seitz | G01N 30/88 702/22 |

FOREIGN PATENT DOCUMENTS

| | | | |
|---|---|---|---|
| JP | H1137983 | A | 2/1999 |
| JP | 2001208737 | A | 8/2001 |
| JP | 3267005 | B2 | 3/2002 |
| JP | 3740798 | B2 | 2/2006 |
| WO | 2023113804 | A1 | 6/2023 |
| WO | 2023148554 | A1 | 8/2023 |

* cited by examiner

SYSTEMS AND METHODS FOR INJECTION MONITORING AND DIAGNOSTICS FOR GAS CHROMATOGRAPHY

BACKGROUND INFORMATION

Gas chromatography (GC) is an analytical technique used to separate and analyze (e.g., detect, identify, and/or quantify) chemical components of a sample mixture. GC is performed by injecting a sample into an inlet (also referred to as an injector) of a gas chromatograph by inserting a syringe needle through a septum of the inlet. The injected sample is vaporized in the inlet, and a mobile phase (typically called the carrier gas) flows through the inlet and carries the vaporized sample through a column (a long, narrow tube) with a stationary phase. The mobile phase may be an inert gas or an unreactive gas, such as helium, argon, nitrogen, hydrogen, or argon/methane. The components of the sample are differentially retained within the column by the stationary phase based on various chemical and physical properties of the components and elute from the column at different times. The eluting components are carried by the mobile phase to a detector, which may detect the components and generate signals representative of the detected components.

Various problems may arise when the sample is injected into the inlet. For example, air bubbles may be drawn into the syringe when the sample is aspirated from a vial, resulting in the air bubbles being injected into the inlet. In some cases, the level of the sample in the vial may be below the tip of the syringe needle so that the sample is not drawn into the syringe, resulting in no sample being injected into the inlet. In other cases, the syringe needle may get plugged if the syringe needle cores the septum of the inlet, thus preventing the sample from being injected into the inlet. In some instances, the syringe needle and/or syringe plunger may be bent, thus preventing a complete injection of the sample.

However, these problems may not be apparent to a user or even detectable or diagnosable by the user when they occur. For example, once a sample has been injected and passed through the stationary phase, any issues with the injection may no longer be detectable, such as insufficient sample volume aspirated by the syringe, injection of air bubbles, and/or injection of less than the full amount of the sample. The low volume of some injections, which may be on the order of fractions of a milliliter (mL), may make detection of faulty injections practically impossible for a user to detect. If no signal is detected for an injection, a user may not be able to diagnose the cause or determine whether the problem occurred at the inlet, at the detector, or at some other location (e.g., within the column).

Conventional approaches for monitoring for and detecting faulty injections include doping internal standards into the sample and comparing the signals representative of the internal standards with expected signals for the internal standards. However, the use of internal standards increases the cost, complexity, and time to perform GC experiments. While internal standards can help detect a faulty injection, the use of internal standards is not helpful to diagnose the cause of the faulty injection.

SUMMARY

The following description presents a simplified summary of one or more aspects of the methods and systems described herein to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects of the methods and systems described herein in a simplified form as a prelude to the more detailed description that is presented below.

In some illustrative examples, a system for gas chromatography comprises: an inlet configured to receive a sample by injection; a column comprising a stationary phase; a flow control system configured to regulate, based on a flow control parameter, flow of a mobile phase through the inlet and the column; and an injection monitoring system configured to perform a process comprising: obtaining flow control data representative of a measure of the flow control parameter over time during a time period encompassing an injection of the sample into the inlet; determining, based on the flow control data, that the injection was unsuccessful; and performing, based on the determination that the injection was unsuccessful, a mitigation operation.

In some illustrative examples, an injection monitoring system for a gas chromatography system comprises: one or more processors; and memory storing executable instructions that, when executed by the one or more processors, cause a computing device to perform a process comprising: obtaining flow control data from a flow control system included in the gas chromatography system and configured to regulate, based on a flow control parameter, flow of a fluid through an inlet of the gas chromatography system, wherein the flow control data is representative of a measure of the flow control parameter over time during a time period encompassing injection of a sample into the inlet; determining, based on the flow control data, that the injection was unsuccessful; and directing, based on the determination that the injection was unsuccessful, the gas chromatography system to perform a mitigation operation to mitigate the unsuccessful injection of the sample.

In some illustrative examples, a non-transitory computer-readable medium stores instructions that, when executed, direct at least one processor of a computing device for a gas chromatography system to perform a process comprising: obtaining flow control data from a flow control system configured to regulate, based on a flow control parameter, flow of a fluid through an inlet of a gas chromatography system, wherein the flow control data is representative of a measure of the flow control parameter over time during a time period encompassing injection of a sample into the inlet; determining, based on the flow control data, that the injection was unsuccessful; and performing, based on the determination that the injection was unsuccessful, a mitigation operation.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Systems and methods for monitoring injections into an inlet of a gas chromatography (GC) system and diagnosing unsuccessful injections are described herein. For example, an injection monitoring system may obtain flow control data from a flow control system configured to regulate, based on a flow control parameter, flow of a fluid through an inlet of a GC system. The flow control data may be representative of a measure of the flow control parameter over time during a time period encompassing injection of a sample into the inlet. Based on the flow control data, the injection monitoring system may determine that the injection was unsuccessful. Based on the determination that the injection was not successful, the injection monitoring system may direct the GC system to perform a mitigation operation to mitigate the unsuccessful injection of the sample.

In some examples, the flow control parameter is a pulse width modulated (PWM) valve drive signal for a valve of the flow control system, a pressure signal output by a pressure sensor of the flow control system, or a flow rate signal output by a flow rate sensor of the flow control system.

The systems and methods described herein improve GC systems and GC methods by detecting unsuccessful injections when they occur, even in cases in which a user may not otherwise be able to discern any problems in the injection. The systems and methods described herein also improve GC systems and GC methods by mitigating unsuccessful injections, such as by discarding data acquired based on an otherwise unsuccessful injection, performing a diagnostic process to identify a cause of the unsuccessful injection, and/or providing an alert. In some examples, the systems and methods described herein quantify a volume of sample injected for each injection, including partial injections, which information can be used to appropriately scale (if necessary) the acquired GC data. The system and methods described herein eliminate the need for using costly, complex, and time-consuming internal standards to monitor injection quality. The systems and methods described herein may be implemented across a wide range of instruments and experiment conditions, with little to no extra work for a user. The systems and methods described herein may also be implemented on legacy GC systems without the need to install new hardware.

Various embodiments will now be described in more detail with reference to the figures. The systems and methods described herein may provide one or more of the benefits mentioned above and/or various additional and/or alternative benefits that will be made apparent herein.

Illustrative systems and methods for monitoring injections, diagnosing unsuccessful injections, and mitigating unsuccessful injections will now be described with reference to an illustrative gas chromatography (GC) system. The described GC system is illustrative and not limiting.

Figure 1:
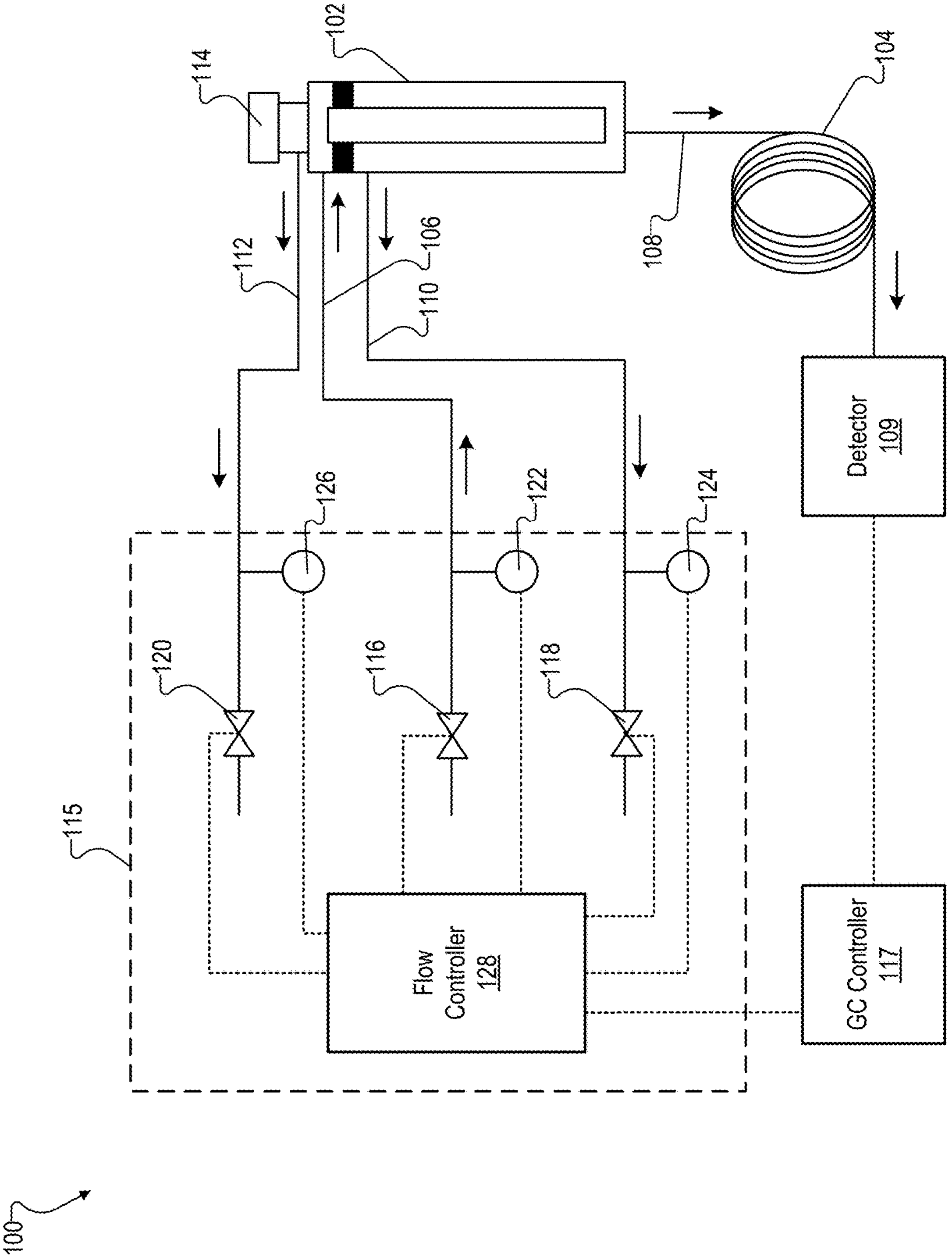
FIG. 1 shows a functional diagram of an illustrative gas chromatography (GC) system capable of split mode and splitless mode injections.

FIG. 1 shows a functional diagram of an illustrative GC system 100 capable of split mode and splitless mode injections. GC system 100 includes an inlet 102, a column 104, an input path 106, a column path 108, a detector 109, a split path 110, a purge path 112, a flow control system 115, and a GC controller 117. GC system 100 may include additional or alternative components as may serve a particular implementation, such as a charcoal trap (not shown) to trap contaminants, an oven, and/or an autosampler.

Inlet 102 (which may also be referred to as an injector) includes a septum 114 that covers and seals inlet 102. Septum 114 may be formed of a self-sealing material, such as silicone. Alternatively, septum 114 may be a mechanical spring-assisted device that opens and closes as the needle is inserted. Inlet 102 receives a sample by injection when a syringe needle (not shown) pierces or opens septum 114 and injects the sample from the syringe into inlet 102. A sample may include one or more analytes of interest dissolved in a solvent. Illustrative solvents include, without limitation, methanol, acetone, pentane, hexane, iso-octane, etc. Inlet 102 receives a mobile phase (e.g., a carrier gas) via input path 106. The sample mixes with the mobile phase in inlet 102 and a portion of the fluid mixture exits inlet 102 via column path 108 and passes through column 104. Column 104 includes a stationary phase, which may be solid or liquid. Column 104 separates components within the injected sample based on their interaction with the stationary phase. Detector 109 is coupled to an output end of column 104 and detects the components of the sample as the components elute from column 104. In some examples, detector 109 is a gas chromatography detector, such as a flame ionization detector or a thermal conductivity detector. In other examples, detector 109 is a mass spectrometer. Data generated by detector 109 may be output to GC controller 117.

A small portion of the fluid exits inlet 102 via purge path 112. Purge path 112 provides a flow path to vent a portion of the fluid out of inlet 102 to purge contaminants that may be introduced into inlet 102 by septum 114 when septum 114 is pierced by the syringe needle. Purge path 112 vents the fluid before any contaminants from septum 114 mix with the injected sample.

Inlet 102 may be a split/splitless (SSL) inlet or a programmable temperature vaporizing (PTV) inlet. The PTV inlet may also be capable of operating in a split mode and/or a splitless mode. In split mode, a portion of the fluid exits inlet 102 via split path 110. Split path 110 provides a flow path to vent fluid out of inlet 102. The ratio of the flow rate of fluid exiting inlet 102 via split path 110 to the flow rate of the fluid exiting inlet 102 via column 104 is referred to as the "split ratio". Any suitable split ratio may be used, such as but not limited to 10:1, 20:1, 50:1, 100:1. In splitless mode, fluid does not exit inlet 102 via split path 110. In both split mode and splitless mode, the flow rate of carrier gas flowing into inlet 102 is equal to the sum of the flow rates of fluid exiting inlet 102 (taking the volume of injected sample as negligible).

GC controller 117 is communicatively coupled with, and configured to control operations of, GC system 100. GC controller 117 may include any suitable hardware (e.g., a processor, circuitry, etc.) and/or software configured to control operations of and/or interface with the various components of GC system 100 (e.g., detector 109, flow control system 115, an oven, an autosampler, etc.). GC controller 117 receives data output by detector 109 and may process the data (e.g., generate a chromatogram, generate a mass spectrum, analyze the data, transmit the data to another computing system, etc.) and/or store the data (e.g., in memory). GC controller 117 may also include and/or provide a user interface configured to enable interaction between a user and GC controller 117. The user may interact with GC controller 117 via the user interface by tactile, visual, auditory, and/or other sensory type communication. For example, the user interface may include a display device (e.g., liquid crystal display (LCD) display screen, a touch screen, etc.) for displaying information (e.g., chromatograms, mass spectra, notifications, etc.) to the user. The user interface may also include an input device (e.g., a keyboard, a mouse, a touchscreen device, etc.) that allows the user to provide input to GC controller 117. In other examples the display device and/or input device may be separate from, but communicatively coupled to, GC controller 117. For instance, the display device and the input device may be included in a computer (e.g., a desktop computer, a laptop computer, etc.) communicatively connected to GC controller 117 by way of a wired connection (e.g., by one or more cables) and/or a wireless connection. While FIG. 1 shows that GC controller 117 is included in GC system 100, GC controller 117 may alternatively be implemented in whole or in part separately from GC system 100, such as by a computing device communicatively coupled to GC system 100 by way of a wired connection (e.g., a cable) and/or a network (e.g., a local area network, a wireless network (e.g., Wi-Fi), a wide area network, the Internet, a cellular data network, etc.).

Flow control system 115 is configured to regulate the flow of fluid into and exiting inlet 102. Flow control system 115 includes a set of valves, a set of pressure sensors, and a flow controller. Flow control system 115 may include any additional or alternative components as may suit a particular implementation. A valve 116 on input path 106 regulates the flow of carrier gas into inlet 102, a valve 118 on split path 110 regulates the flow of fluid exiting inlet 102 via split path 110, and a valve 120 on purge path 112 regulates the flow of fluid exiting inlet 102 via purge path 112. Valves 116, 118, and 120 may include any suitable valve, such as a proportional valve. A pressure sensor 122 downstream of valve 116 measures head pressure of inlet 102/column 104, a pressure sensor 124 upstream of valve 118 measures pressure at valve 118, and a pressure sensor 126 upstream of valve 120 measures pressure at valve 120. Pressure sensors 122, 124, and 126 may sample inlet pressure at any suitable sampling rate. In some examples, the sampling rate ranges from 0.5 Hz to 500 Hz or 1 kHz. In further examples, the sampling rate ranges from 1 Hz to 100 Hz.

Flow controller 128 is configured to control (e.g., open and close) valves 116, 118, and/or 120 to regulate the flow of fluid into and exiting inlet 102. For example, in a flow control mode, flow controller 128 may regulate the flow of fluid through any one or more of input path 106, split path 110, and/or purge path 112 to maintain a target flow rate through column path 108 and column 104 and/or to maintain a target split ratio. In a pressure control mode, flow controller 128 may regulate the flow of fluid through any one or more of input path 106, split path 110, and/or purge path 112 to maintain a target pressure within inlet 102.

In some examples, flow controller 128 uses feedback control to regulate the flow of fluid into and exiting inlet 102. To this end, flow controller 128 is communicatively coupled with valves 116, 118, and 120 and with pressure sensors 122, 124, and 126. Flow controller 128 receives pressure signals output by any one or more of pressure sensors 122, 124, and 126 and generates, based on the pressure signals, a valve drive signal for one or more of valves 116, 118, and 120. In some examples, the valve drive signal is a pulse width modulated (PWM) valve drive signal (e.g., a voltage, a current, or a digital value) that specifies an ON/OFF duty cycle for the valve. For example, a PWM valve drive signal with a 50% duty cycle is ON half the time and OFF half the time, while a PWM valve drive signal with a 30% duty cycle is on 30% of the time and OFF 70% of the time. Flow controller 128 outputs a valve drive signal to valve 116, 118, and/or 120 to regulate the flow of fluid through input path 106, column path 108, split path 110, and/or purge path 112. The conductance of column 104 is known or can be determined based on instrument properties and characteristics, so measured pressure signals can be easily correlated to flow rates.

In some examples, GC system 100 operates using forward-pressure regulation in which flow controller 128 generates PWM valve drive signals for any one or more of valves 116, 118, and 120 based on the pressure signal output by any one or more of pressure sensors 122, 124, and 126. In some examples, inlet pressure is forward-pressure regulated while split path 110 and/or purge path 112 are either back-pressure regulated or forward-pressure regulated.

Flow controller 128 may include any suitable hardware (e.g., a processor, circuitry, etc.) and/or software configured to control and/or interface with valves 116, 118, and 120 and pressure sensors 122, 124, and 126. While FIG. 1 shows that flow controller 128 is separate from GC controller 117, flow controller 128 may alternatively be implemented in whole or in part by GC controller 117.

It will be recognized that GC system 100 is merely illustrative and may be modified as may suit a particular implementation. For example, GC system 100 may include, in addition to or instead of pressure sensors 122, 124, and/or 126, flow sensors that measure flow rates of input path 106, column path 108, split path 110, and/or purge path 112. The flow sensors may be any suitable type of sensor configured to measure flow rate, such as a mass flow sensor or a combination pressure sensor and flow restrictor. In some examples, flow sensors are used in place of pressure sensors.

In some examples, flow control system 115 does not adjust or change operation of valves 116, 118, and 120 but rather maintains the duty cycle of the valve drive signals even with detected changes in pressure. Pressure may be regulated, for example, using back-pressure regulation or forward-pressure regulation.

When a sample is injected into inlet 102, the sample vaporizes under the high temperature of the inlet. The increased vapor volume sample momentarily increases the pressure within inlet 102. Flow control system 115 detects the increased pressure (or change in flow rates) and responds to the increased pressure by adjusting the PWM valve drive signal of valve 116, 118, and/or 120 to decrease pressure within inlet 102.

Figure 2:
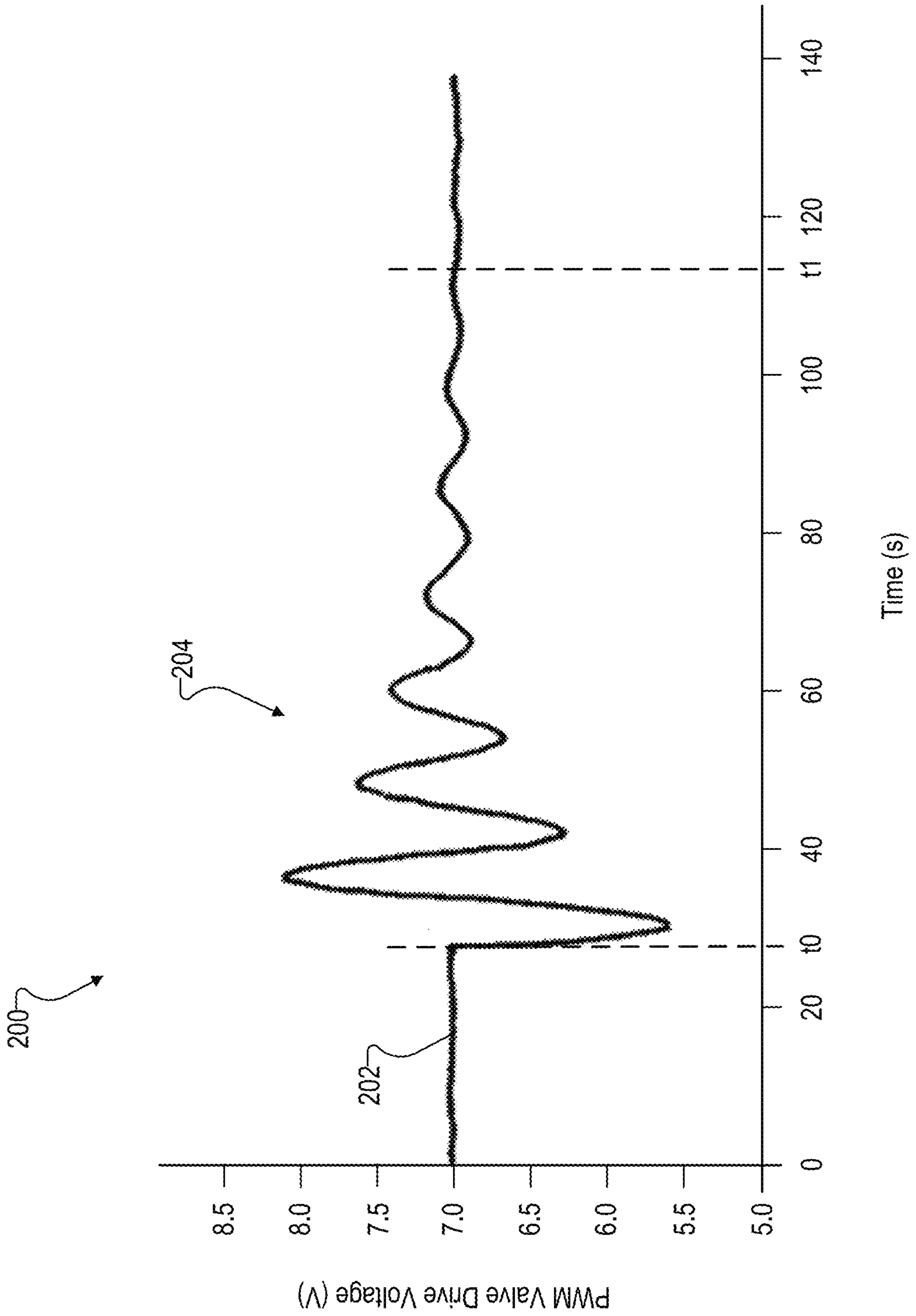
FIG. 2 shows an illustrative graph of a pulse width modulated (PWM) valve drive signal over time during a time period encompassing injection of a sample into an inlet of the GC system of FIG. 1.

FIG. 2 shows an illustrative graph 200 of a PWM valve drive signal (e.g., for valve 116) over time during a time period encompassing injection of a sample into inlet 102. The PWM valve drive signal may be extracted from raw time data obtained or generated by flow control system 115 (e.g., by valves 116, 118, and/or 120, by pressure sensors 122, 124, and/or 126, and/or by flow controller 128). In the example of FIG. 2, the PWM valve drive signal is a voltage signal supplied to a valve (e.g., valve 116). However, in other examples the PWM valve drive signal may be a current signal or a digital signal representative of a voltage or current supplied to the valve. A curve 202 shows the average voltage (V) of the PWM valve drive signal as function of time during the time period. As can be seen, the PWM valve drive signal is in a steady-state before time to, indicating that the pressure within inlet 102 is at a steady-state. A volume of a sample is injected into inlet 102 at time to, which increases pressure within inlet 102. Curve 202 includes a perturbation 204 indicating the response of flow controller 128 to bring the pressure within inlet 102 back to a steady-state. As shown by the waveform of perturbation 204, the average PWM valve drive signal initially decreases (e.g., to close the valve and reduce pressure within inlet 102). The feedback control of the PWM valve drive signal continues until the system returns to the steady-state at time t1 (approximately 85 seconds after the injection at time t0). Damping of flow control system 115 may be adjusted to change the time to return to steady-state.

Although not shown, a measure of inlet pressure over time (as measured by one or more pressure sensors, such as pressure sensors 122, 124, and/or 126) during a time period encompassing the injection may also have a similar waveform with a perturbation, as in FIG. 2. Similarly, a measure of flow rate over time (as measured by one or more flow rate sensors) during a time period encompassing the injection may also have a similar waveform with a perturbation, as in FIG. 2. However, the waveform for the measure of inlet pressure or the measure of flow rate will likely be perturbed in the opposite direction than the PWM valve drive signal. For example, the measure of pressure or the measure of flow will increase when the PWM valve drive signal decreases, and vice versa.

The PWM valve drive signal, inlet pressure, and flow rate are flow control parameters that may be extracted from raw time data and used, alone or in combination, to detect and/or diagnose an unsuccessful injection, as will be described below in more detail. The measure of a flow control parameter over time during a time period encompassing an injection may be characterized by one or more characterization metrics. Illustrative characterization metrics may include, without limitation:

a. a baseline (e.g., steady-state) measure of the flow control parameter (e.g., approximately 7 V in FIG. 2);
b. a maximum amplitude of the perturbation waveform (e.g., the maximum change in valve drive signal duty cycle or maximum change in PWM valve drive signal, the maximum change in inlet pressure, the maximum change in flow rate through input path 106, etc.), measured as the difference between the maximum value of the flow control parameter and the baseline;
c. an integrated change of the perturbation waveform, calculated as the sum of the differences between each value and the baseline (e.g., an integrated change of the PWM valve drive signal during the time period, an integrated inlet pressure during the time period, or an integrated flow rate during the time period);
d. an absolute value of an integrated change of the perturbation waveform, calculated as the sum of the absolute value of the difference between each value and the baseline (e.g., an absolute value of an integrated change of the PWM valve drive signal during the time period, an absolute value of an integrated inlet pressure during the time period, or an absolute value of an integrated flow rate during the time period);
e. a root mean square (RMS) error of the perturbation waveform, calculated as the square root of the sum of the squared difference between each value and the baseline;
f. a duration of the perturbation waveform, calculated as the difference in time from the sample injection to reaching steady-state again;
g. a period of oscillation of the perturbation waveform; and
h. a sign (e.g., positive or negative) of the first peak of the perturbation waveform (e.g., an initial direction of the perturbation waveform).

It will be recognized that other characterization metrics may be extracted from raw time data as may suit a particular implementation. Any one or more characterization metrics may be used, alone or in combination, by an injection monitoring system to detect an unsuccessful injection and, in some cases, to diagnose a cause of the unsuccessful injection.

Figure 3:
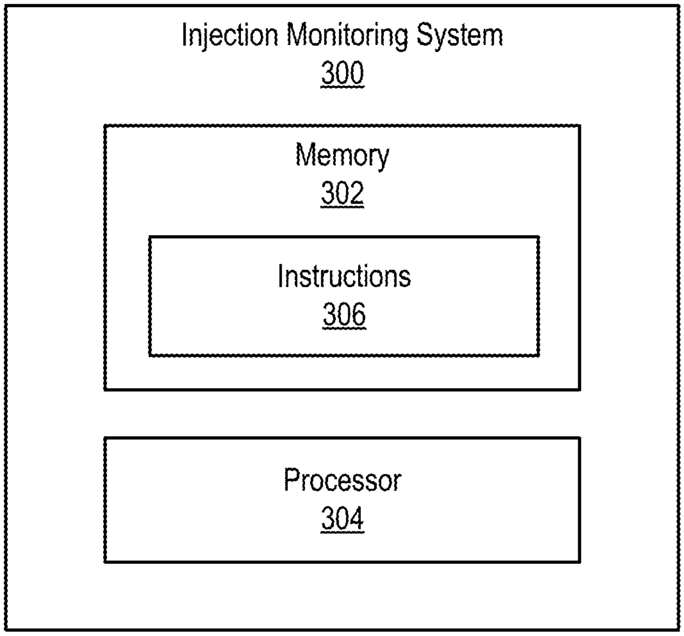
FIG. 3 shows a functional diagram of an illustrative injection monitoring system.

FIG. 3 shows a functional diagram of an illustrative injection monitoring system 300 ("system 300"). System 300 may be implemented entirely or in part by GC system 100 (e.g., by GC controller 117, by flow controller 128, and/or by some other computing system included in GC system 100). Alternatively, system 300 may be implemented entirely or in part separately from GC system 100 (e.g., a remote computing device, system, and/or server separate from but communicatively coupled to GC controller 117 or flow controller 128).

System 300 may include, without limitation, a memory 302 and a processor 304 selectively and communicatively coupled to one another. Memory 302 and processor 304 may each include or be implemented by hardware and/or software components (e.g., processors, memories, communication interfaces, instructions stored in memory for execution by the processors, etc.). In some examples, memory 302 and processor 304 may be distributed between multiple devices and/or multiple locations as may serve a particular implementation.

Memory 302 may maintain (e.g., store) executable data used by processor 304 to perform any of the operations described herein. For example, memory 302 may store instructions 306 that may be executed by processor 304 to perform any of the operations described herein. Instructions 306 may be implemented by any suitable application, software, code, and/or other executable data instance.

Memory 302 may also maintain any data acquired, received, generated, managed, used, and/or transmitted by processor 304. For example, memory 302 may maintain and/or store a cross-correlation algorithm, an injection classification model, and/or a vapor volume estimation model, as described below.

Processor 304 may be configured to perform (e.g., execute instructions 306 stored in memory 302 to perform) various processing operations described herein. It will be recognized that the operations and examples described herein are merely illustrative of the many different types of operations that may be performed by processor 304. In the description herein, any references to operations performed by system 300 may be understood to be performed by processor 304 of system 300. Furthermore, in the description herein, any operations performed by system 300 may be understood to include system 300 directing or instructing another system or device to perform the operations.

Figure 4:
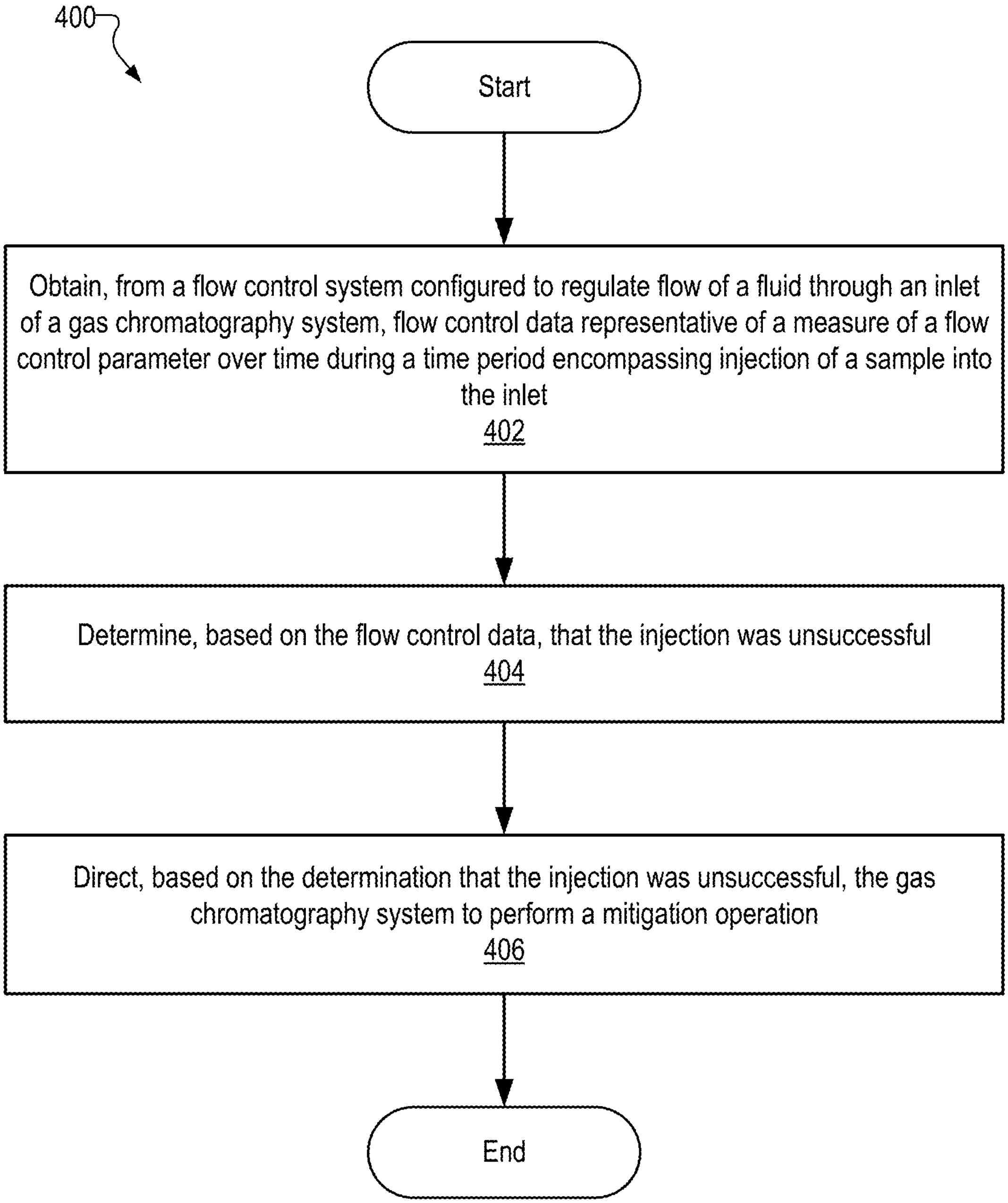
FIG. 4 shows an illustrative method of detecting an unsuccessful injection.

FIG. 4 shows an illustrative method 400 of detecting an unsuccessful injection. While FIG. 4 shows illustrative operations according to one embodiment, other embodiments may omit, add to, reorder, and/or modify any of the operations shown in FIG. 4.

At operation 402, system 300 obtains flow control data from a flow control system (e.g., flow control system 115) that regulates, based on a flow control parameter, flow of a fluid through an inlet (e.g., inlet 102) of a GC system (e.g., GC system 100). The flow control data is representative of a measure of the flow control parameter over time during a time period encompassing injection of a sample into the inlet. Flow control data includes raw time data and/or data representative of one or more characterization metrics extracted from the raw time data. In some examples, system 300 obtains flow control data in response to the injection of the sample. For example, system 300 may determine that the injection has been performed and, in response to the determination that the injection has been performed, obtain the flow control data. System 300 may determine that the injection has been performed in any suitable way, such as based on injection data transmitted by an autosampler and/or based on an injection schedule. In other examples, system 300 obtains flow control data continuously or regularly irrespective of performance of any injections.

In some examples, the flow control parameter is a PWM valve drive signal for a valve of the flow control system (e.g., valve 116, 118, and/or 120). In other examples, the flow control parameter is a pressure signal output by a pressure sensor of the flow control system (e.g., pressure sensor 122, 124, and/or 126). The pressure signal output by the pressure sensor is representative of pressure within inlet 102, at split path 110, or at purge path 112. In yet further examples, the flow control parameter is a flow rate signal output by a flow sensor of the flow control system (e.g., a flow rate sensor on input path 106).

The time period of the flow control data may have any suitable duration. In some examples, the time period is a duration that is set in advance (e.g., in advance of the injection or in advance of performing a GC experiment) and that is set to encompass an expected perturbation in the measure of the flow control parameter, a period of time prior to the expected perturbation (e.g., while the measure of the flow control parameter is in a steady state), and a period of time following the expected perturbation (e.g., while the measure of the flow control parameter is in the steady state). The duration of the perturbation may depend on various factors, such as the damping of the flow control system (e.g., overdamped, underdamped, critically damped), the time constant for feedback control by the flow control system, the volume of the injection, the volume of the inlet's capacity, and the type of inlet (e.g., SSL, PTV, etc.). In some examples, the duration of the time period ranges from 10 seconds to 120 seconds. In further examples, the duration of the time period ranges from 15 seconds to 60 seconds. In some examples, the time period includes a preset period of time prior to perturbation (e.g., 2 to 5 seconds) and a period of time after the perturbation (e.g., 2 to 5 seconds). The flow control data may have any suitable sampling rate, such as 0.5 Hz to 1 kHz, 5 Hz to 500 Hz, 10 Hz to 100 Hz, or any other suitable sampling rate.

At operation 404, system 300 determines, based on the flow control data, that the injection was unsuccessful. An unsuccessful injection (also referred to herein as a "faulty" injection) is any injection in which less than a threshold amount of sample is injected into the inlet. The threshold amount may be the full volume or a percentage (e.g., 95%) of the full volume of sample expected or specified to be injected into the inlet. For example, method parameters for a GC experiment may specify a particular quantity of sample to be injected into the inlet (e.g., 2.0 μL, 1.0 μL, 0.5 μL). Accordingly, an autosampler may draw into a syringe the specified quantity of sample from a sample vial and then inject the contents of the syringe into the inlet. An injection of less than the specified amount (e.g., due to aspiration from the sample vial of less than the specified quantity, injection of air bubbles, a plugged needle, a bent needle, etc.) is an unsuccessful injection. An unsuccessful injection includes partial injections (where at least some sample is injected) and empty injections in which no sample is injected.

In some examples in which system 300 obtains flow control data continuously or regularly irrespective of any injections, system 300 may determine, in response to the injection of the sample, that the injection was unsuccessful. For example, system 300 may determine that the injection has been performed and, in response to the determination that the injection has been performed, determine whether the injection was unsuccessful. System 300 may determine that the injection has been performed in any way described herein. In further examples, system 300 may determine that the injection has been performed based on the flow control data (e.g., based on detection of a perturbation in the measure of the flow control data).

System 300 determines that the injection was unsuccessful if the measure of the flow control parameter (e.g., the perturbation) does not behave as expected in response to the injection. System 300 may determine that the flow control parameter does not behave as expected in various different ways.

In some examples, system 300 determines that the flow control parameter does not behave as expected by comparing the flow control data with reference flow control data and determining, based on the comparison, that the flow control data varies from the reference flow control data. The reference flow control data is representative of an expected measure of the flow control parameter (e.g., the PWM valve drive signal, inlet pressure, or flow rate) over time during a time period encompassing a reference injection. In some examples, the reference flow control data is representative of the measure of the flow control parameter during a prior time period encompassing a prior injection of a sample into the inlet during the current GC experiment. In these examples, a prior successful injection during the same GC experiment may be used as a reference injection for monitoring subsequent injections. In further examples, the reference flow control data is representative of the measure of the flow control parameter during multiple prior time periods encompassing multiple prior injections of a sample into the inlet during the current GC experiment. In these examples, flow control data associated with multiple prior successful injections is aggregated (e.g., averaged or otherwise statistically processed) to generate the reference flow control data for a reference injection.

In other examples, the reference flow control data is generated prior to the current GC experiment based on one or more prior injections. In some examples, the reference flow control data may be updated as subsequent injections (by the current GC experiment and/or any other GC experiment by the same or different GC systems) are performed successfully.

System 300 may determine that the flow control data varies from the reference flow control data in any suitable way using any suitable technique. In some examples, system 300 cross-correlates the flow control data associated with the current injection with the reference flow control data. Any suitable cross-correlation algorithm or technique may be used. The flow control data and reference flow control data are aligned in time relative to the injection. The cross-correlation may compare any one or more characterization metrics derived or extracted from the flow control data and reference flow control data. In conventional cross-correlation techniques, the time-series data would be normalized along the y-axis to a reference value. However, in examples where the characterization metrics include amplitude of the perturbation, system 300 would not normalize the time-series data since the amplitude of the perturbation is indicative of the vapor volume of the injected sample and therefore is used in the cross-correlation.

System 300 may determine that the flow control data varies from the reference flow control data in any suitable way, such as when the result of the cross-correlation is less than a threshold value. For example, where the correlation coefficient of the cross-correlation ranges from +1.0 (perfect positive correlation) to −1.0 (perfect negative correlation) with 0 indicating no linear relationship, the threshold value may be +0.97, +0.95, +0.90, or any other suitable value.

Additionally or alternatively to using reference flow control data, system 300 determines that the flow control parameter does not behave as expected based on an injection classification model trained to classify, based on flow control data, an injection as either successful or unsuccessful. For example, system 300 may extract data representative of one or more characterization metrics from the flow control data (e.g., from the measure of the flow control parameter over time during the time period associated with the injection) and apply (e.g., input) the extracted characterization metric data to the injection classification model. In some examples, the characterization metric data applied to the injection classification model is representative of a maximum amplitude of the perturbation waveform, an integrated change of the perturbation waveform, and/or an absolute value of an integrated change of the perturbation waveform, as described above. In some examples, data representative of one or more other experiment condition parameters may also be applied as input to the injection classification model, including, without limitation, the split ratio (when operated in split mode), the type of the inlet, the volume of the inlet, temperature of the inlet, pressure in the inlet, the solvent type of the sample, and the type of carrier gas.

Based on the inputs to the injection classification model, the injection classification model classifies the injection as either successful or unsuccessful. The injection classification model, and illustrative methods for training the injection classification model, will be described below in more detail.

In yet further examples, system 300 determines that the flow control parameter does not behave as expected by determining a theoretical vapor volume of the injection, estimating an actual vapor volume of the injection, and comparing the estimated vapor volume of the injection to the theoretical vapor volume of the injection.

System 300 may calculate the theoretical vapor volume of the injection using the ideal gas law according to equation (1):

$$V_t(g) = \frac{n \cdot R \cdot T}{P} \tag{1}$$

where $V_t(g)$ is the theoretical vapor volume of the injected sample, n is the amount of the injected sample (in moles), R is the universal gas constant, T is the temperature of the inlet, and P is the pressure in the inlet. The amount of the injected sample n may be calculated according to equation (2):

$$n = \frac{V(\ell) \cdot \rho}{M} \tag{2}$$

where $V(\ell)$ is the volume of the sample in the liquid phase (prior to injection), p is the density of the sample in the liquid phase, and M is the molar mass of the sample in grams (g)/mol. As noted above, the sample includes the analyte of interest dissolved in a solvent. Where the quantity of the analyte of interest is low (e.g., the sample solution is dilute), the contribution of the analyte of interest can be assumed to be negligible and thus ignored. As noted above, the method parameters for the GC experiment may specify volume $V(\ell)$ of the sample to be injected into the inlet, and the other information may be accessed from GC system 100, from a remote computing system (e.g., server), and/or input by a user. In some examples, the theoretical vapor volume $V_t(g)$ of the injected sample may be calculated or estimated using a non-ideal gas equation, such as the van der Waals equation.

System 300 may estimate the actual vapor volume of the injection based on a vapor volume estimation model trained to estimate, based on flow control data, the actual vapor volume of an injected sample. This method is based on the fact that the characteristics of perturbation of the flow control parameter are based at least in part on the actual vapor volume of the injected sample. Accordingly, system 300 may extract data representative of one or more characterization metrics from the raw time data (e.g., from the measure of the flow control parameter over time during the time period associated with the injection) and input the extracted characterization metric data to the vapor volume estimation model. One or more other experiment condition parameters may also be input to the injection classification model, including, without limitation, the split ratio (when operated in split mode), the type of the inlet, the volume of the inlet, temperature of the inlet, pressure in the inlet, the solvent type of the sample, and the type of carrier gas.

Based on the inputs to the vapor volume estimation model, the vapor volume estimation model estimates the actual vapor volume $V_e(g)$ of the sample injected into the inlet. The vapor volume estimation model, and illustrative methods for training the vapor volume estimation model, will be described below in more detail.

System 300 may compare the estimated actual vapor volume $V_e(g)$ of the injected sample to the theoretical vapor volume $V_t(g)$ of the injected sample. System 300 may determine that the injection was unsuccessful based on (e.g., in response to) a determination that the estimated actual vapor volume $V_e(g)$ varies from the theoretical vapor volume $V_t(g)$ by more than a threshold amount, such as by more than a threshold volume amount (e.g., 0.05 μL, 0.1 μL, etc.) or by more than a threshold percentage of the theoretical vapor volume $V_t(g)$ (e.g., 5%, 10%, etc.). The percentage variation of the estimated actual vapor volume $V_e(g)$ may be given, for example, by the following equation (3):

$$V_e(g)\text{ variation }\% = \frac{|V_t(g) - V_e(g)|}{V_t(g)} \tag{3}$$

Referring again to FIG. 4, at operation 406 system 300 directs, based on (e.g., in response to) the determination that the injection was unsuccessful, the GC system (e.g., GC system 100) to perform a mitigation operation to mitigate the unsuccessful injection of the sample. In some examples, the mitigation operation comprises providing a notification that the injection was unsuccessful. The notification may be provided via a display screen associated with (e.g., included in or communicatively coupled with) system 300 or with the GC system. In additional or alternative examples, the mitigation operation comprises discarding data associated with the unsuccessful injection. For example, the GC system (e.g., detector 109 or GC controller 117) may discard any data acquired by GC analysis of the sample that was unsuccessfully injected. In yet further examples, the mitigation operation comprises a diagnostic process to determine a cause of the unsuccessful injection. An illustrative diagnostic process will be described with reference to FIG. 5.

Figure 5:
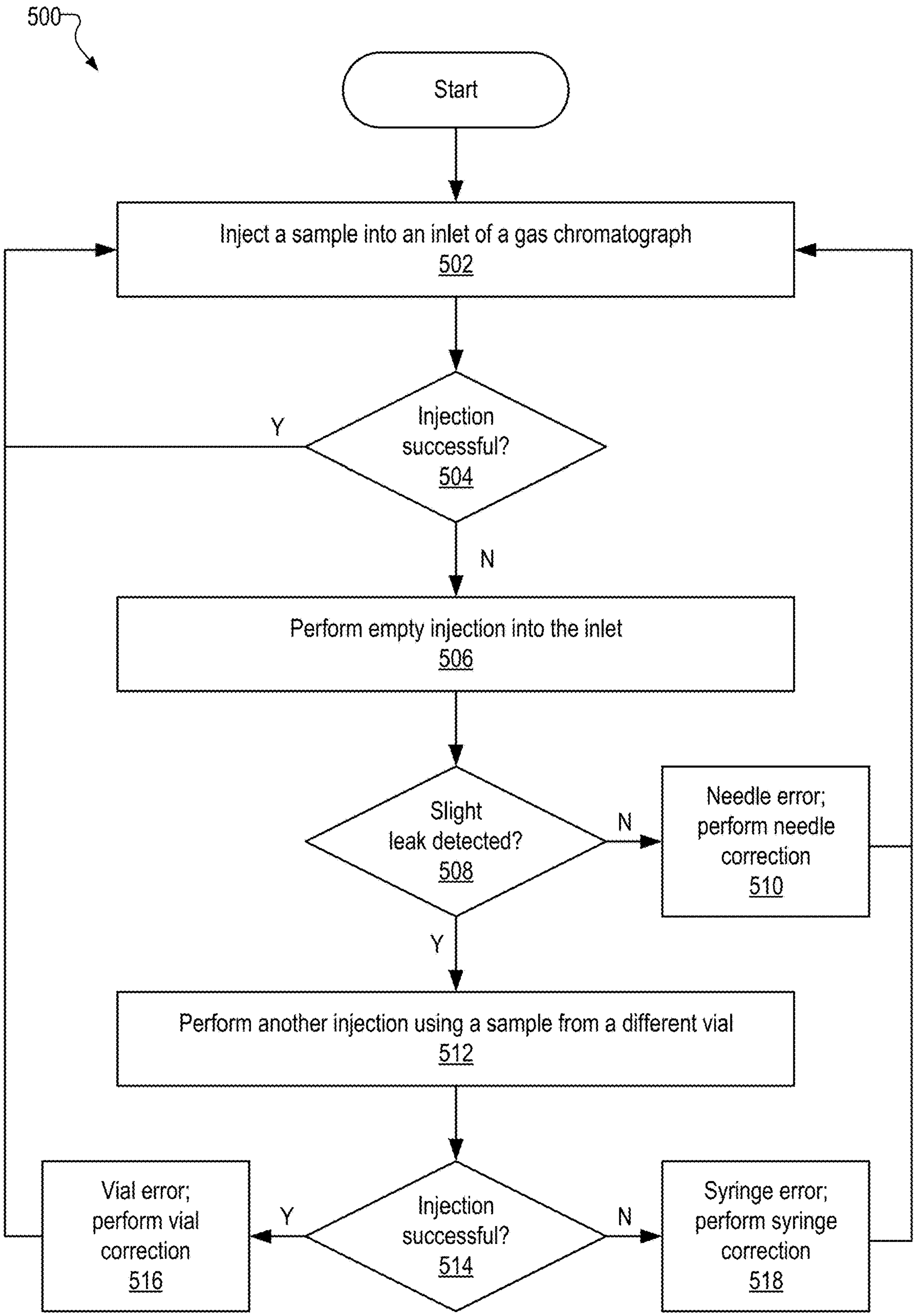
FIG. 5 shows an illustrative method of performing a GC experiment with injection monitoring and diagnostics.

FIG. 5 shows an illustrative method 500 of performing a GC experiment with injection monitoring and diagnostics. While FIG. 5 shows illustrative operations according to one embodiment, other embodiments may omit, add to, reorder, and/or modify any of the operations shown in FIG. 5.

At operation 502, a sample is injected into an inlet of a gas chromatograph. The injection may be performed in any way described herein.

At operation 504, system 300 checks whether the injection was successful. System 300 may perform operation 504 in any way described herein. If system 300 determines that the injection was successful, processing returns to operation 502 for a next injection. If system 300 determines that the injection was unsuccessful, system 300 performs a diagnostic process to determine a cause of the unsuccessful injection.

The diagnostic process begins with operations 506 and 508, which are performed to check whether the syringe needle is damaged (e.g., bent) such that the needle cannot pierce the septum. At operation 506, system 300 directs the GC system (e.g., GC system 100) to perform an "empty injection" by inserting the needle through the septum and into the inlet while the inlet pressure is relatively high but without injecting any sample (or by delaying injection of the sample long enough for any response by flow control system to return to steady-state). In some cases, the GC system may need to increase the pressure in the inlet for the empty injection. For example, the pressure for the empty injection may be greater than or equal to a threshold pressure level of 20 psig, 25 psig, 30 psig, 40 psig, or even 45 psig. Piercing or opening the septum while the inlet is under high pressure normally results in a temporary decrease in pressure as carrier gas escapes through the hole in the septum (as opposed to a temporary increase in pressure when a sample is injected and vaporized). This temporary decrease in pressure in the inlet results in a characteristic perturbation in the measure of the flow control parameter (e.g., PWM valve drive signal, inlet pressure, and/or flow rate).

At operation 508, system 300 determines whether the inlet slightly leaked as expected. Operation 508 may be performed using any of the methods described above with reference to method 400. For example, system 300 may obtain flow control data representative of a measure of a flow control parameter over time during a time period encompassing the empty injection. System 300 may then determine, based on the flow control data, whether the measure of the flow control parameter did not behave as expected in response to the empty injection (e.g., whether the measure of the flow control parameter includes a perturbation characteristic of a slight leak through the septum).

If system 300 determines that the measure of the flow control parameter did not behave as expected, system 300 determines that the inlet did not slightly leak as expected and, therefore, that the needle is damaged (e.g., bent). Processing of method 500 then proceeds to operation 510. At operation 510, system 300 determines that the needle is damaged and directs the GC system to perform a needle correction operation. The needle correction operation may include providing a notification (e.g., by way of a display screen associated with GC controller 117 and/or a display screen associated with system 300) that the needle is likely damaged and/or should be examined. Additionally or alternatively, the needle correction operation may include directing an autosampler of the GC system to discard the syringe and use a replacement syringe. Processing then returns to operation 502 to perform a next injection or to repeat the injection.

If, however, system 300 determines that the measure of the flow control parameter behaved as expected, system 300 determines that the inlet slightly leaked as expected and, therefore, that the needle is not damaged. Processing of method 500 then proceeds to operation 512 for a next step in the diagnostic process (operations 512 and 514) to check for a vial error (e.g., whether the sample vial was empty or too low).

At operation 512, system 300 directs the GC system to perform an additional sample injection using an additional sample drawn from a different vial (e.g., a sample vial or a wash vial). The additional injection may be performed in any way described herein.

At operation 514, system 300 obtains additional flow control data representative of a measure of a flow control parameter over a time period encompassing the additional injection and checks, based on the additional flow control data, whether the additional injection performed at operation 512 was successful. System 300 may perform operation 514 in any way described herein. If system 300 determines that the additional injection performed at operation 512 was successful, system 300 determines that the vial used for the injection at operation 502 was likely empty and proceeds to operation 516.

At operation 516, system 300 directs the GC system to perform a vial correction operation. In some examples, the vial correction operation includes providing a notification (e.g., by way of a display screen associated with GC controller 117 and/or a display screen associated with system 300) that the vial used at operation 502 was likely empty or too low. Additionally or alternatively, the vial correction operation may include discarding any data acquired at operation 502. Processing of method 500 then returns to operation 502 for a next injection. In some examples, operation 516 may be omitted so that processing of method 500 returns to operation 502 in response to a determination that the injection performed at operation 512 was successful.

Referring again to operation 514, if system 300 determines that the additional injection was unsuccessful, system 300 proceeds to operation 518. At operation 518, system 300 determines that there is a problem with the syringe (e.g., the needle is likely clogged or the syringe plunger is bent) and directs the GC system to perform a syringe correction operation. The syringe correction operation may include providing a notification (e.g., by way of a display screen associated with GC controller 117 and/or a display screen associated with system 300) that there is likely a problem with the syringe and/or that the syringe should be examined.

Additionally or alternatively, the syringe correction operation may include directing an autosampler of the GC system to discard the syringe and use a replacement syringe. Additionally or alternatively, the syringe correction operation may include discarding any data acquired at operation 502. Processing then returns to operation 502 to perform a next injection or to repeat the injection.

Figure 6:
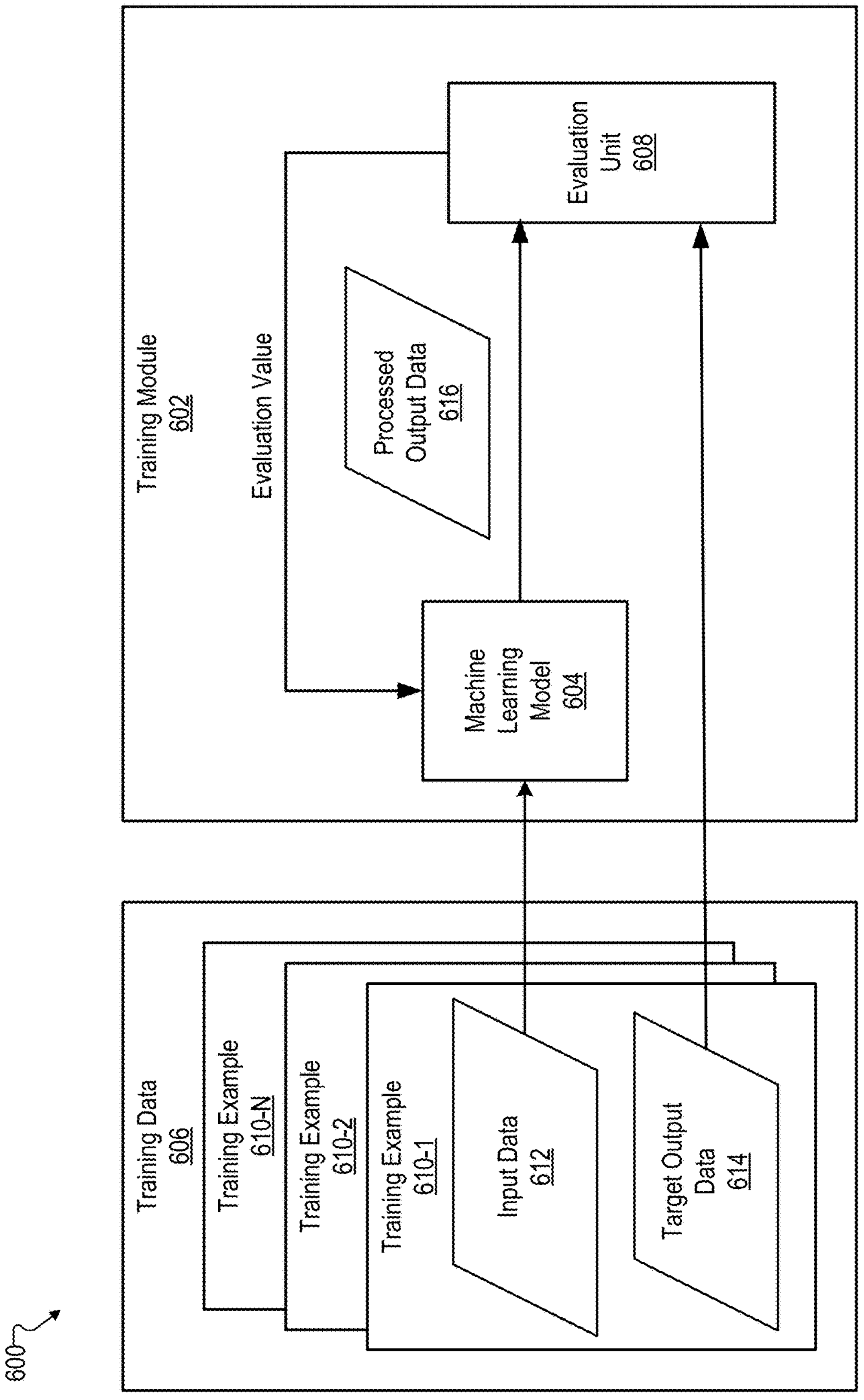
FIG. 6 shows a block diagram of an illustrative training stage to train an injection classification model and a vapor volume estimation model.

Illustrative methods of training an injection classification model and a vapor volume estimation model will now be described. FIG. 6 shows a block diagram of an illustrative training stage 600 in which a training module 602 trains a machine learning model 604, using training data 606 and an evaluation unit 608, to classify an injection or to estimate an actual vapor volume of an injected sample. When trained as described herein, machine learning model 604 may implement an injection classification model or a vapor volume estimation model used in method 400 or method 500.

Training module 602 may perform any suitable heuristic, process, and/or operation that may be configured to train machine learning model 604. In some examples, training module 602 is implemented by hardware and/or software components (e.g., processors, memories, communication interfaces, instructions stored in memory for execution by the processors, etc.). In some examples, training module 602 is implemented by system 300, or any component or implementation thereof. For example, training module 602 may be implemented by a GC controller 117. Alternatively, training module 602 may be implemented by a computing system (e.g., a personal computer or a remote server) separate from but communicatively coupled with GC system 100.

In some examples, machine learning model 604 is implemented using one or more supervised and/or unsupervised learning algorithms. In some examples in which trained machine learning model 604 implements an injection classification model, machine learning model 604 is implemented by a classification algorithm, such as, but not limited to, an AdaBoost classifier, a gradient boosting classifier, a random forest classifier, or a support vector classifier. In some examples in which trained machine learning model 604 implements a vapor volume estimation model, machine learning model 604 is implemented by a neural network (e.g., a convolutional neural network (CNN)) having an input layer, one or more hidden layers, and an output layer. In some examples, the CNN comprises a long short-term memory (LSTM) network. In other examples in which trained machine learning model 604 implements a vapor volume estimation model, machine learning model 604 is implemented by a multi-regression model, such as but not limited to a LASSO regression model, a ridge regression model, a Boosted Decision Tree regression model, a Decision Forest regression model, a Fast Forest Quantile regression model, or an ordinal regression model.

Training data 606 includes a set of training examples 610 (e.g., training examples 610-1 through 610-N). Training data 606 may be generated in any suitable way. In some examples, training data 606 is generated based on a series of injections performed over time. Each training example 610 corresponds to a particular injection and includes input data 612 and target output data 614.

Input data 612 includes flow control data, including raw time data associated with the respective injection and/or data representative of one or more characterization metrics derived from the raw time data. The characterization metrics may include any characterization metrics described above that characterize a measure of a flow control parameter over time during a time period encompassing the injection. In some examples, the input data 612 also includes data representative of experiment condition parameters, such as but not limited to the split ratio (when the injection is performed in split mode), the type of the inlet, the volume of the inlet, temperature of the inlet, pressure in the inlet, the solvent type of the sample, and the type of carrier gas.

Target output data 614 is the known desired output from machine learning model 604 and may be used for evaluating the output of machine learning model 604. When trained machine learning model 604 implements an injection classification model, target output data 614 is representative of a classification of the injection, e.g., "successful" or "unsuccessful" (or other similar or suitable classification). When trained machine learning model 604 implements a vapor volume estimation model, target output data 614 is representative of the vapor volume of the injected sample. The vapor volume of the injected sample may be determined in any suitable way, including empirically and/or theoretically, as described above.

As shown in FIG. 6, input data 612 of training example 610-1 is provided as an input vector to machine learning model 604, which is trained to provide processed output data 616 (e.g., an injection classification or an estimated vapor volume). Target output data 614 may be provided as input to evaluation unit 608, which is configured to determine (e.g., compute), based on processed output data 616 output from machine learning model 604 and input data 612, an evaluation value that is provided to machine learning model 604. Based on the evaluation value, training module 602 may adjust one or more model parameters of machine learning model 604. Machine learning model 604 may then be trained on the next training example (e.g., training example 610-2), and training may proceed through all training examples 610. Training on training examples 610 may be repeated.

In some examples, training data 606 is split into two subsets of data, such that a first subset of training data 606 is used for training machine learning model 604 and a second subset of training data is used to score machine learning model 604. For example, training data 606 may be split so that a first percentage (e.g., 75%) of training examples 610 are used as the training set for training machine learning model 604 and a second percentage (e.g., 25%) of the training examples 610 are used as the scoring set to generate an accuracy score for machine learning model 604.

Figure 7:
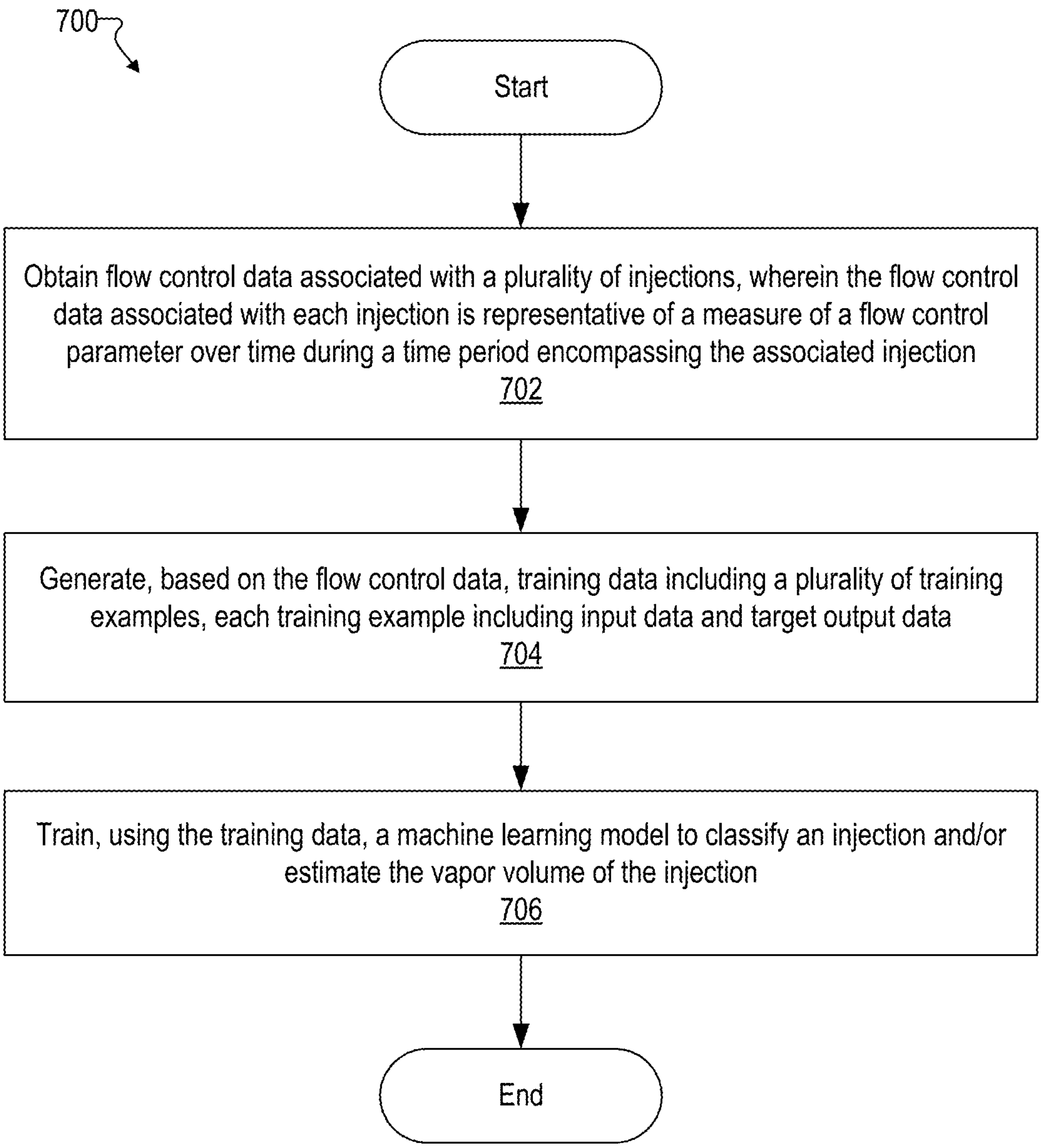
FIG. 7 shows an illustrative method that may be performed to train a machine learning model to classify an injection of a sample or to estimate a vapor volume of an injected sample.

FIG. 7 shows an illustrative method 700 that may be performed to train machine learning model 604 to classify an injection of a sample or to estimate a vapor volume of an injected sample. While FIG. 7 shows illustrative operations according to one embodiment, other embodiments may omit, add to, reorder, and/or modify one or more operations of the method 700 depicted in FIG. 7. Each operation of method 700 depicted in FIG. 7 may be performed in any manner described herein.

At operation 702, training module 602 obtains flow control data associated with a plurality of injections. The flow control data associated with each injection is representative of a measure of a flow control parameter over time during a time period encompassing the associated injection.

At operation 704, training module 602 generates, based on the flow control data, training data 606 including a plurality of training examples 610. Each training example 610 includes input data 612 and target output data 614. Input data 612 includes data representative of one or more characterization metrics derived from the flow control data associated with the respective injection. The target output data 614 is the known desired output from machine learning model 604. When machine learning model 604 is trained to classify the injection, target output data 614 is representative of a classification of the injection, e.g., "successful" or "unsuccessful" (or other similar or suitable classification). When machine learning model 604 is trained to estimate a vapor volume of an injected sample, target output data 614 is representative of the vapor volume of the injected sample. The vapor volume of the injected sample may be determined in any suitable way, including empirically and/or theoretically, as described above.

At operation 706, training module 602 uses training data 606 to train machine learning model 604 to provide processed output data 616, which classifies the injection and/or estimates the vapor volume of the injection. Once trained, machine learning model 604 may be used in method 400 and/or method 500 to determine if an injection was successful.

Figure 8:
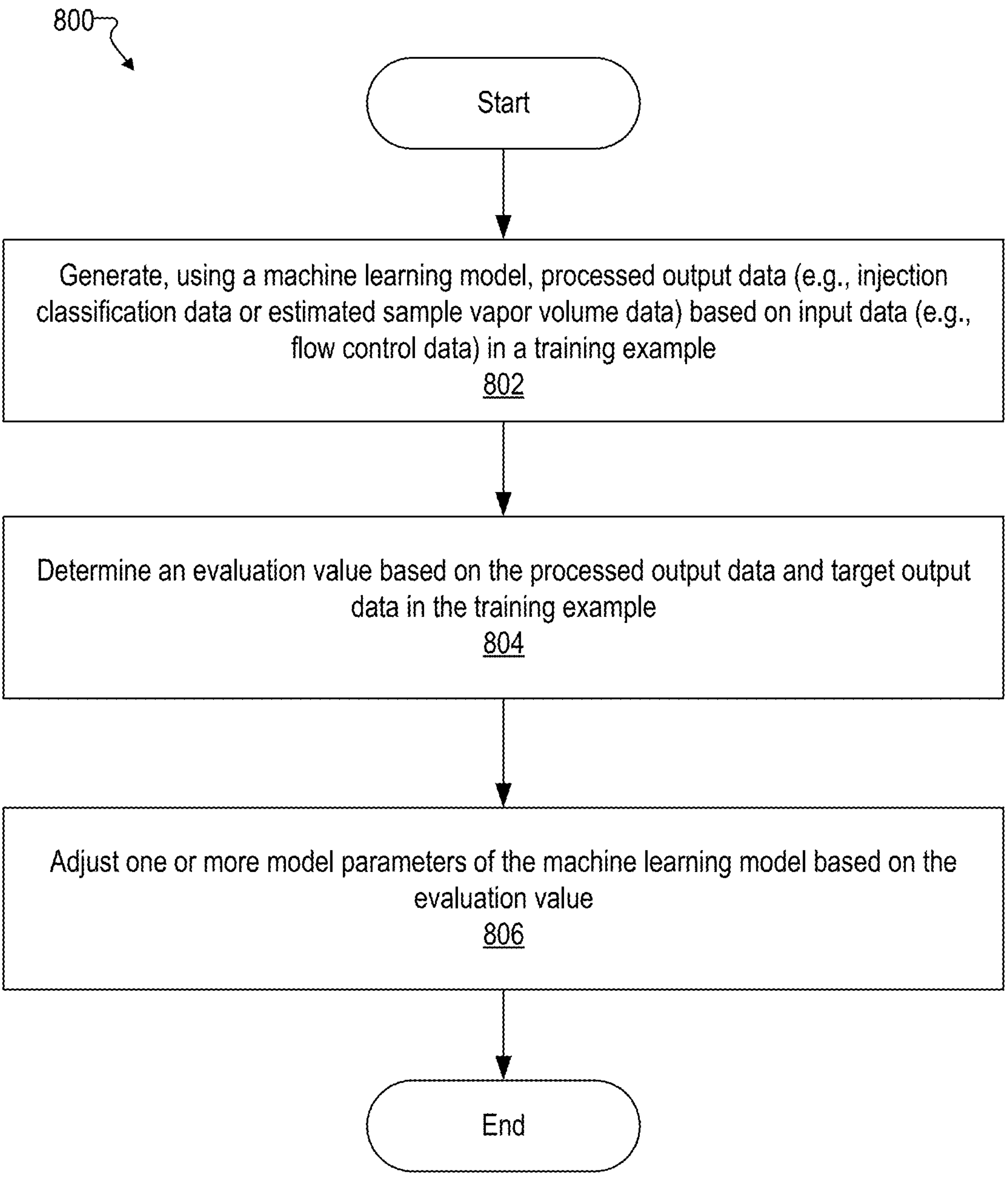
FIG. 8 shows an illustrative method of training a machine learning model with a training example.

FIG. 8 shows an illustrative method 800 of training machine learning model 604 with a training example 610 during training stage 600 of FIG. 6. While FIG. 8 shows illustrative operations according to one embodiment, other embodiments may omit, add to, reorder, and/or modify one or more operations of the method 800. Each operation of method 800 depicted in FIG. 8 may be performed in any manner described herein.

At operation 802, training module 602 generates, using machine learning model 604, processed output data 616 (e.g., injection classification data or estimated sample vapor volume data) based on input data 612 (e.g., flow control data, such as characterization metric data derived from raw time data) in training example 610-1.

At operation 804, training module 602 determines an evaluation value based on target output data 614 and processed output data 616 in training example 610-1. For example, as shown in FIG. 6, training module 602 may provide processed output data 616 generated by machine learning model 604 and target output data 614 in training example 610-1 into evaluation unit 608. Evaluation unit 608 may determine the evaluation value based on target output data 614 and processed output data 616. The evaluation value is any value representing a comparison of target output data 614 and processed output data 616, such as a mean squared difference. Other implementations for determining the evaluation value are also possible and contemplated.

At operation 806, training module 602 adjusts one or more model parameters of machine learning model 604 based on the determined evaluation value. For example, as shown in FIG. 6, training module 602 may back-propagate the evaluation value determined by evaluation unit 608 to machine learning model 604 and adjust the model parameters of machine learning model 604 (e.g., weight values assigned to various data elements in training examples 610) based on the evaluation value.

In some embodiments, training module 602 may determine whether the model parameters of machine learning model 604 have been sufficiently adjusted. For example, training module 602 may determine that machine learning model 604 has been subjected to a predetermined number of training cycles and therefore has been trained with a predetermined number of training examples. Additionally or alternatively, training module 602 may determine that the evaluation value satisfies a predetermined evaluation value threshold for a threshold number of training cycles, and thus determine that the model parameters of machine learning model 604 have been sufficiently adjusted. Additionally or alternatively, training module 602 may determine that the evaluation value remains substantially unchanged for a predetermined number of training cycles (e.g., a difference between the evaluation values computed in sequential training cycles satisfies a difference threshold), and thus determine that the model parameters of machine learning model 604 have been sufficiently adjusted.

In some embodiments, responsive to determining that the model parameters of machine learning model 604 have been sufficiently adjusted, training module 602 may determine that the training stage of machine learning model 604 is completed and select the current values of the model parameters to be values of the model parameters in trained machine learning model 604. Trained machine learning model 604 may implement an injection classification model or a vapor volume estimation model, as the case may be.

In some examples, machine learning model 604 is trained based on training data 606 acquired during multiple different experiments performed under different sets of experiment conditions. As a result, trained machine learning model 604 may be used across a wide range of experiment conditions. Experiment conditions include, without limitation, the split ratio (when operated in split mode), the type of the inlet, the volume of the inlet, temperature of the inlet, pressure in the inlet, the solvent type of the sample, and the type of carrier gas. Machine learning model 604 may be trained for use under a wide range of experiment conditions in any suitable way.

In some examples, training data 606 includes a plurality of subsets of training data. Each subset of training data is acquired based on a distinct set of experiment conditions. Training module 602 may train machine learning model 604 on each individual subset of training data serially in a plurality of training stages. For example, training module 602 may train machine learning model 604 on a first subset of training data 606 in a first training stage. Upon completion of training with the first subset, training module 602 may train machine learning model 604 on a second subset of training data 606 in a second training stage. Upon completion of training with the second subset, training module 602 may train machine learning model 604 on a third subset of training data 606 in a third training stage, and so forth.

Alternatively, data from multiple different subsets of training data may be mixed so that machine learning model 604 is trained on the different subsets of training data in one training stage. For example, training examples from the various different subsets of training data may be mixed (e.g., randomly) to form training data 606.

In some examples, machine learning model 604 is trained based on training data 606 configured for specific experiment conditions. In such examples, the trained machine learning model 604 may be used thereafter only for subsequent iterations of that specific experiment.

In some examples, machine learning model 604 may be refined or further trained in real time during an analytical experiment. In some embodiments, training module 602 may continue to collect training examples 610 and train machine learning model 604 with the collected training examples 610 over time during an experiment. For example, when training module 602 collects one or more additional training examples from one or more data sources, training module 602 may update the plurality of training examples to include both existing training examples and the additional training examples, and train machine learning model 604 with the updated plurality of training examples according to the training process described herein. Additionally or alternatively, training module 602 may periodically collect additional training examples from one or more other data sources, update the plurality of training examples to include both existing training examples and the additional training examples, and train machine learning model 604 with the updated plurality of training examples at predetermined intervals.

Trained machine learning model 604 may also be scored and/or updated (e.g., re-trained) in real-time during an analytical experiment based on data acquired during the analytical experiment (e.g., based on analytical acquisitions or scans). At various times throughout an analytical experiment, system 300 may perform an assessment to assess the performance of trained machine learning model 604 using analytical data already acquired up to that point. Assessments may be performed at any suitable time, such as periodically (e.g., every nth acquisition), randomly, or in response to a trigger event (e.g., detection of coalescence or peak broadening exceeding a threshold amount). Each assessment may assess the quality of trained machine learning model 604. If system 300 determines during an assessment that an error condition is satisfied, system 300 may retrain and/or update machine learning model 604 using the acquired experimental data.

Various modifications may be made to the methods, apparatuses, and systems described herein. For example, while the methods described herein are described as being performed in real-time during a GC experiment, the methods may be performed at any other time (e.g., after completion of the GC experiment) to determine if acquired data is reliable. If the data is determined to have been acquired with a faulty injection, the data may be discarded.

Various examples above are described as using flow control data (e.g., a measure of inlet pressure) based on an output of pressure sensor 122 to determine if an injection was unsuccessful. In other examples, flow control data based on an output of pressure sensor 124 (on split path 110) or pressure sensor 126 (on purge path 112) may be used to determine if an injection was unsuccessful. Pressure sensor 124 and pressure sensor 126 may not be as sensitive as pressure sensor 122 (which measures inlet pressure) but may still exhibit a perturbation in the flow control data. In further examples, flow control data based on the output of any two or three pressure sensors may be used (e.g., pressure sensors 122 and 124; pressure sensors 122 and 126; pressure sensors 124 and 126; or pressure sensors 122, 124, and 126). In a similar manner, flow control data based on an output of any one or more flow sensors may be used to determine if an injection was unsuccessful.

Various examples above are described as using a single flow control parameter (e.g., PWM valve drive signal, inlet pressure, or flow rate) to determine if an injection was unsuccessful. In other examples, any two or more flow control parameters may be used. For example, system 300 may apply both the PWM valve drive signal and the inlet pressure to the injection classification model or vapor volume estimation model to determine if an injection was unsuccessful. In a similar manner, the injection classification model and/or vapor volume estimation model may be trained based on two or more flow control parameters. For example, in FIG. 6, input data 612 may include flow control data for each of two different flow control parameters (e.g., PWM valve drive signal and inlet pressure). Indeed, injection classification model and/or vapor volume estimation model may be trained on any set of characterization metrics for any set of flow control parameters associated with any combination of sources of flow control data (e.g., any one or more valves, any one or more pressure sensors, and/or any one or more flow sensors).

In some examples, system 300 may be configured to classify an injection as successful (or full), partial, or empty, and may use these different classifications to diagnose a faulty injection. For example, system 300 may determine classify an injection as partial and thus omit operations 506, 508 and 510 of method 500 (based on an assumption that a partial injection suggests the needle was not damaged). In a similar manner, system 300 may determine that a needle is damaged based on a classification of the injection as an empty injection.

Additionally or alternatively, system 300 may determine a vapor volume of a partial injection based on the flow control data associated with the partial injection, as described above, and then adjust the acquired GC data by scaling the GC data based on the estimated vapor volume and the theoretical vapor volume for the injection.

In certain examples, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain examples, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 9:
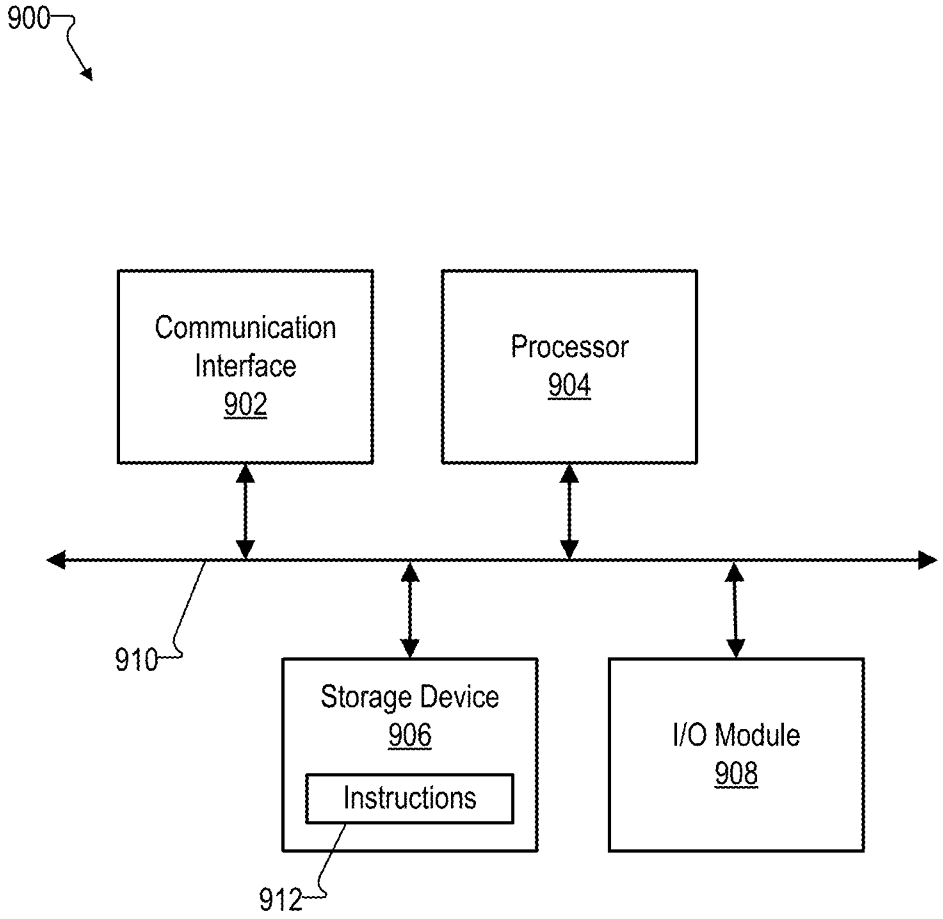
FIG. 9 shows an illustrative computing device that may be specifically configured to perform one or more of the processes described herein.

FIG. 9 shows an illustrative computing device 900 that may be specifically configured to perform one or more of the processes described herein. As shown in FIG. 9, computing device 900 may include a communication interface 902, a processor 904, a storage device 906, and an input/output ("I/O") module 908 communicatively connected one to another via a communication infrastructure 910. While an illustrative computing device 900 is shown in FIG. 9, the components illustrated in FIG. 9 are not intended to be limiting. Additional or alternative components may be used in other embodiments. Components of computing device 900 shown in FIG. 9 will now be described in additional detail.

Communication interface 902 may be configured to communicate with one or more computing devices. Examples of communication interface 902 include, without limitation, a wired network interface (such as a network interface card), a wireless network interface (such as a wireless network interface card), a modem, an audio/video connection, and any other suitable interface.

Processor 904 generally represents any type or form of processing unit capable of processing data and/or interpreting, executing, and/or directing execution of one or more of the instructions, processes, and/or operations described herein. Processor 904 may perform operations by executing computer-executable instructions 912 (e.g., an application, software, code, and/or other executable data instance) stored in storage device 906.

Storage device 906 may include one or more data storage media, devices, or configurations and may employ any type, form, and combination of data storage media and/or device. For example, storage device 906 may include, but is not limited to, any combination of the non-volatile media and/or volatile media described herein. Electronic data, including data described herein, may be temporarily and/or permanently stored in storage device 906. For example, data representative of computer-executable instructions 912 configured to direct processor 904 to perform any of the operations described herein may be stored within storage device 906. In some examples, data may be arranged in one or more databases residing within storage device 906.

I/O module 908 may include one or more I/O modules configured to receive user input and provide user output. One or more I/O modules may be used to receive input for a single virtual experience. I/O module 908 may include any hardware, firmware, software, or combination thereof supportive of input and output capabilities. For example, I/O module 908 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 908 is configured to provide graphical data to a display for presentation to a user. The graphical data may be representative of one or more graphical user interfaces and/or any other graphical content as may serve a particular implementation.

In some examples, any of the systems, computing devices, and/or other components described herein may be implemented by computing device 900. For example, memory 302 may be implemented by storage device 906, and processor 304 may be implemented by processor 904.

It will be recognized by those of ordinary skill in the art that while, in the preceding description, various illustrative embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

Advantages and features of the present disclosure can be further described by the following examples:

Example 1. A system for gas chromatography, comprising: an inlet configured to receive a sample by injection; a column comprising a stationary phase; a flow control system configured to regulate, based on a flow control parameter, flow of a mobile phase through the inlet and the column; and an injection monitoring system configured to perform a process comprising: obtaining flow control data representative of a measure of the flow control parameter over time during a time period encompassing an injection of the sample into the inlet; determining, based on the flow control data, that the injection was unsuccessful; and performing, based on the determination that the injection was unsuccessful, a mitigation operation.

Example 2. The system of example 1, wherein the flow control system comprises: a pressure sensor that measures inlet pressure; a valve that regulates flow of the mobile phase into the inlet; and a flow controller that receives pressure signals output by the pressure sensor and outputs, based on the pressure signals, a pulse width modulated (PWM) valve drive signal to the valve.

Example 3. The system of example 2, wherein the flow control parameter comprises the inlet pressure.

Example 4. The system of example 2, wherein the flow control parameter comprises the PWM valve drive signal.

Example 5. The system of example 1, wherein: the flow control system comprises a flow sensor that measures flow rate of a mobile phase into the inlet; and the flow control parameter comprises the flow rate of the mobile phase.

Example 6. The system of example 1, wherein: the flow control data indicates a perturbation in the measure of the flow control parameter; and the determining that the injection was unsuccessful comprises determining that the perturbation does not behave as expected.

Example 7. The system of example 6, wherein the determining that the perturbation does not behave as expected is based on one or more characterization metrics that characterize the perturbation.

Example 8. The system of example 7, wherein the one or more characterization metrics comprises at least one of a maximum amplitude of the perturbation, an integrated change of the perturbation, or an absolute value of an integrated change of the perturbation.

Example 9. An injection monitoring system for a gas chromatography system, the injection monitoring system comprising: one or more processors; and memory storing executable instructions that, when executed by the one or more processors, cause a computing device to perform a process comprising: obtaining flow control data from a flow control system included in the gas chromatography system and configured to regulate, based on a flow control parameter, flow of a fluid through an inlet of the gas chromatography system, wherein the flow control data is representative of a measure of the flow control parameter over time during a time period encompassing injection of a sample into the inlet; determining, based on the flow control data, that the injection was unsuccessful; and directing, based on the determination that the injection was unsuccessful, the gas chromatography system to perform a mitigation operation to mitigate the unsuccessful injection of the sample.

Example 10. The injection monitoring system of example 9, wherein: the flow control system comprises a valve; and the flow control parameter comprises a pulse width modulated (PWM) valve drive signal for the valve.

Example 11. The injection monitoring system of example 10, wherein the determining that the injection was unsuccessful is based on at least one of a maximum change in the PWM valve drive signal during the time period, an integrated change of the PWM valve drive signal during the time period, or an absolute value of an integrated change of the PWM valve drive signal during the time period.

Example 12. The injection monitoring system of example 9, wherein: the flow control system comprises a pressure sensor that measures inlet pressure; and the flow control parameter comprises a pressure signal output by the pressure sensor.

Example 13. The injection monitoring system of example 12, wherein the determining that the injection was unsuccessful is based on at least one of a maximum change in inlet pressure during the time period, an integrated inlet pressure during the time period, or an absolute value of an integrated inlet pressure during the time period.

Example 14. The injection monitoring system of example 9, wherein: the flow control system comprises a flow sensor within the inlet; and the flow control parameter comprises flow rate signal output by the flow sensor.

Example 15. The injection monitoring system of example 9, wherein the determining that the injection was unsuccessful comprises applying the flow control data to an injection classification model trained to classify, based on the flow control data, the injection as successful or unsuccessful.

Example 16. The injection monitoring system of example 9, wherein the determining that the injection was unsuccessful comprises: determining a theoretical vapor volume of the injection; estimating an actual vapor volume of the injection; and comparing the estimated actual vapor volume of the injection to the theoretical vapor volume of the injection.

Example 17. The injection monitoring system of example 16, wherein the estimating the actual vapor volume of the injection comprises applying the flow control data to a vapor volume estimation model trained to estimate, based on the flow control data, the actual vapor volume of the injection.

Example 18. The injection monitoring system of example 9, wherein the determining that the injection was unsuccessful comprises: obtaining reference flow control data representative of an expected measure of the flow control parameter over time during a time period encompassing injection of a sample; and determining that the flow control data varies from the reference flow control data.

Example 19. The injection monitoring system of example 18, wherein the determining that the flow control data varies from the reference flow control data comprises cross-correlating the flow control data with the reference flow control data.

Example 20. The injection monitoring system of example 9, wherein the mitigation operation comprises providing a notification that the injection was unsuccessful.

Example 21. The injection monitoring system of example 9, wherein the mitigation operation comprises a diagnostic process comprising: performing an empty injection into the inlet while pressure within the inlet is at or above a threshold pressure level; and detecting, based on the empty injection, that the measure of the flow control parameter did not behave as expected in response to the empty injection.

Example 22. The injection monitoring system of example 21, further comprising: directing an autosampler to perform an additional injection of the sample with a replacement syringe.

Example 23. The injection monitoring system of example 9, wherein: the injected sample was drawn from a first vial; and the mitigation operation comprises a diagnostic process comprising: performing an additional injection with an additional sample drawn from a second vial that is different from the first vial; obtaining additional flow control data from the flow control system, wherein the additional flow control data is representative of a measure of the flow control parameter over time during a time period encompassing the additional injection; and determining, based on the additional flow control data, whether the additional injection was successful or unsuccessful.

Example 24. A non-transitory computer-readable medium storing instructions that, when executed, direct at least one processor of a computing device for a gas chromatography system to perform a process comprising: obtaining flow control data from a flow control system configured to regulate, based on a flow control parameter, flow of a fluid through an inlet of a gas chromatography system, wherein the flow control data is representative of a measure of the flow control parameter over time during a time period encompassing injection of a sample into the inlet; determining, based on the flow control data, that the injection was unsuccessful; and performing, based on the determination that the injection was unsuccessful, a mitigation operation.

Example 25. The computer-readable medium of example 24, wherein the determining that the injection was unsuccessful comprises applying the flow control data to an injection classification model trained to classify, based on the flow control data, the injection as successful or unsuccessful.

Example 26. The computer-readable medium of example 24, wherein the determining that the injection was unsuccessful comprises: determining a theoretical vapor volume of the injection; estimating an actual vapor volume of the injection; and comparing the estimated actual vapor volume of the injection to the theoretical vapor volume of the injection.

Example 27. The computer-readable medium of example 26, wherein the estimating the actual vapor volume of the injection comprises applying the flow control data to a vapor volume estimation model trained to estimate, based on the flow control data, the actual vapor volume of the injection.

Example 28. The computer-readable medium of example 24, wherein the determining that the injection was unsuccessful comprises: obtaining reference flow control data representative of an expected measure of the flow control parameter over time during a time period encompassing a reference injection; and determining, based on a cross-correlation of the flow control data with the reference flow control data, that the flow control data varies from the reference flow control data.

Example 29. The computer-readable medium of example 24, wherein the flow control parameter comprises at least one of a pulse width modulated (PWM) valve drive signal for a valve of the flow control system, inlet pressure measured by a pressure sensor of the flow control system, or a flow rate of a mobile phase measured by a flow sensor of the flow control system.

Example 30. The computer-readable medium of example 24, wherein: the flow control data indicates a perturbation in the measure of the flow control parameter; and the determining that the injection was unsuccessful comprises determining that the perturbation does not behave as expected.

Example 31. The computer-readable medium of example 30, wherein the determining that the perturbation does not behave as expected is based on one or more characterization metrics that characterize the perturbation.

Example 32. The computer-readable medium of example 31, wherein the one or more characterization metrics comprises at least one of a maximum amplitude of the perturbation, an integrated change of the perturbation, or an absolute value of an integrated change of the perturbation.

What is claimed is:

1. A system for gas chromatography, comprising:

an inlet configured to receive a sample by injection;

a column comprising a stationary phase;

a flow control system configured to regulate, based on a flow control parameter, flow of a mobile phase through the inlet, wherein the flow control system comprises:

a pressure sensor that measures inlet pressure;

a valve that regulates flow of the mobile phase into or out of the inlet; and a flow controller that receives pressure signals output by the pressure sensor and outputs, based on the pressure signals, a pulse width modulated (PWM) valve drive signal to the valve; and an injection monitoring system configured to perform a process comprising:

obtaining flow control data representative of a measure of the flow control parameter over time during a time period encompassing an injection of the sample into the inlet;

determining, based on the flow control data, that the injection was unsuccessful; and performing, based on the determination that the injection was unsuccessful, a mitigation operation.

2. The system of claim 1, wherein the flow control parameter comprises the PWM valve drive signal.

3. The system of claim 1, wherein the flow control parameter comprises the inlet pressure.

4. The system of claim 1, wherein:

the flow control system further comprises a flow sensor that measures flow rate of the mobile phase into the inlet; and the flow control parameter comprises the flow rate of the mobile phase.

5. The system of claim 1, wherein:

the flow control data indicates a perturbation in the measure of the flow control parameter caused by the injection; and the determining that the injection was unsuccessful comprises determining that the perturbation does not behave as expected.

6. The system of claim 5, wherein:

the determining that the perturbation does not behave as expected is based on one or more characterization metrics that characterize the perturbation; and the one or more characterization metrics comprises at least one of a maximum amplitude of the perturbation, an integrated change of the perturbation, or an absolute value of an integrated change of the perturbation.

7. An injection monitoring system for a gas chromatography system, the injection monitoring system comprising:

one or more processors; and memory storing executable instructions that, when executed by the one or more processors, cause a computing device to perform a process comprising:

obtaining flow control data from a flow control system included in the gas chromatography system and configured to regulate, based on a flow control parameter, flow of a fluid through an inlet of the gas chromatography system, wherein:

the flow control system comprises:

a pressure sensor that measures inlet pressure;

a valve that regulates flow of the fluid into or out of the inlet; and a flow controller that receives pressure signals output by the pressure sensor and outputs, based on the pressure signals, a pulse width modulated (PWM) valve drive signal to the valve; and the flow control data is representative of a measure of the flow control parameter over time during a time period encompassing injection of a sample into the inlet;

determining, based on the flow control data, that the injection was unsuccessful; and directing, based on the determination that the injection was unsuccessful, the gas chromatography system to perform a mitigation operation to mitigate the unsuccessful injection of the sample.

8. The injection monitoring system of claim 7, wherein:

the flow control parameter comprises the PWM valve drive signal for the valve.

9. The injection monitoring system of claim 8, wherein the determining that the injection was unsuccessful is based on at least one of a maximum change in the PWM valve drive signal during the time period, an integrated change of the PWM valve drive signal during the time period, or an absolute value of an integrated change of the PWM valve drive signal during the time period.

10. The injection monitoring system of claim 7, wherein:

the flow control parameter comprises the inlet pressure.

11. The injection monitoring system of claim 10, wherein the determining that the injection was unsuccessful is based on at least one of a maximum change in inlet pressure during the time period, an integrated inlet pressure during the time period, or an absolute value of an integrated inlet pressure during the time period.

12. The injection monitoring system of claim 7, wherein:

the flow control system further comprises a flow sensor within the inlet; and the flow control parameter comprises a flow rate signal output by the flow sensor.

13. The injection monitoring system of claim 7, wherein the determining that the injection was unsuccessful comprises applying the flow control data to an injection classification model trained to classify, based on the flow control data, the injection as successful or unsuccessful.

14. The injection monitoring system of claim 7, wherein the determining that the injection was unsuccessful comprises:

determining a theoretical vapor volume of the injection;

estimating an actual vapor volume of the injection; and comparing the estimated actual vapor volume of the injection to the theoretical vapor volume of the injection.

15. The injection monitoring system of claim 7, wherein the determining that the injection was unsuccessful comprises:

obtaining reference flow control data representative of an expected measure of the flow control parameter over time during a time period encompassing injection of a sample; and determining that the flow control data varies from the reference flow control data.

16. The injection monitoring system of claim 7, wherein the mitigation operation comprises a diagnostic process comprising:

performing an empty injection into the inlet while pressure within the inlet is at or above a threshold pressure level; and detecting, based on the empty injection, that the measure of the flow control parameter did not behave as expected in response to the empty injection.

17. The injection monitoring system of claim 7, wherein:

the injected sample was drawn from a first vial; and the mitigation operation comprises a diagnostic process comprising:

performing an additional injection with an additional sample drawn from a second vial that is different from the first vial;

obtaining additional flow control data from the flow control system, wherein the additional flow control data is representative of a measure of the flow control parameter over time during a time period encompassing the additional injection; and determining, based on the additional flow control data, whether the additional injection was successful or unsuccessful.

18. A non-transitory computer-readable medium storing instructions that, when executed, direct at least one processor of a computing device for a gas chromatography system to perform a process comprising:

obtaining flow control data from a flow control system configured to regulate, based on a flow control parameter, flow of a fluid through an inlet of a gas chromatography system, wherein:

the flow control system comprises:

a pressure sensor that measures inlet pressure;

a valve that regulates flow of the fluid into or out of the inlet; and a flow controller that receives pressure signals output by the pressure sensor and outputs, based on the pressure signals, a pulse width modulated (PWM) valve drive signal to the valve; and the flow control data is representative of a measure of the flow control parameter over time during a time period encompassing injection of a sample into the inlet;

determining, based on the flow control data, that the injection was unsuccessful; and performing, based on the determination that the injection was unsuccessful, a mitigation operation.

19. The computer-readable medium of claim 18, wherein the determining that the injection was unsuccessful comprises applying the flow control data to an injection classification model trained to classify, based on the flow control data, the injection as successful or unsuccessful.

20. The computer-readable medium of claim 18, wherein the determining that the injection was unsuccessful comprises:

determining a theoretical vapor volume of the injection;

estimating an actual vapor volume of the injection; and comparing the estimated actual vapor volume of the injection to the theoretical vapor volume of the injection.

21. The computer-readable medium of claim 18, wherein the determining that the injection was unsuccessful comprises:

obtaining reference flow control data representative of an expected measure of the flow control parameter over time during a time period encompassing a reference injection; and determining, based on a cross-correlation of the flow control data with the reference flow control data, that the flow control data varies from the reference flow control data.

22. The computer-readable medium of claim 18, wherein the flow control parameter comprises at least one of a pulse width modulated (PWM) valve drive signal for a valve of the flow control system, inlet pressure measured by a pressure sensor of the flow control system, or a flow rate of a mobile phase measured by a flow sensor of the flow control system.

23. The computer-readable medium of claim 18, wherein:

the flow control data indicates a perturbation in the measure of the flow control parameter caused by the injection; and the determining that the injection was unsuccessful comprises determining that the perturbation does not behave as expected.

* * * * *